(12) United States Patent
Schilling

(10) Patent No.: US 8,672,047 B2
(45) Date of Patent: Mar. 18, 2014

(54) APPARATUS FOR MOUNTING A SCRAPER ASSEMBLY TO AN ACCESSORY MOUNT OF A DISC OPENER THAT ALLOWS DEFLECTION OF THE SCRAPER ASSEMBLY

(75) Inventor: Robin B. Schilling, Darfield (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 144 days.

(21) Appl. No.: 12/616,489

(22) Filed: Nov. 11, 2009

(65) Prior Publication Data

US 2011/0108295 A1 May 12, 2011

(51) Int. Cl.
*A01B 15/16* (2006.01)

(52) U.S. Cl.
USPC ........................................ 172/566

(58) Field of Classification Search
USPC .............................. 172/558–566
See application file for complete search history.

(56) References Cited

U.S. PATENT DOCUMENTS

| | | | |
|---|---|---|---|
| 1,203,156 A | 10/1916 | Sturrock | |
| 1,204,240 A | 11/1916 | Bozard | |
| 1,248,953 A | 12/1917 | Treadwell | |
| 1,264,970 A | 5/1918 | Pfeifer | |
| 1,837,347 A | 12/1931 | Vandine | |
| 3,833,067 A | 9/1974 | Peterson, Jr. et al. | |
| 4,034,688 A | 7/1977 | Ernst | |
| 4,206,817 A | 6/1980 | Bowerman | |
| 4,330,041 A | 5/1982 | Ankenman | |
| 4,858,699 A * | 8/1989 | Poltrock | 172/558 |
| 5,595,130 A | 1/1997 | Baugher et al. | |
| 5,802,995 A | 9/1998 | Baugher et al. | |
| 6,029,591 A | 2/2000 | Baugher et al. | |
| 6,209,466 B1 | 4/2001 | Wodrich | |
| 6,237,696 B1 | 5/2001 | Mayerle | |
| 6,347,594 B1 | 2/2002 | Wendling et al. | |
| 6,640,732 B2 | 11/2003 | Prairie et al. | |
| 6,659,193 B1 * | 12/2003 | Best et al. | 172/566 |
| 6,874,584 B2 * | 4/2005 | Butterfield et al. | 172/559 |
| 7,357,193 B2 | 4/2008 | Harmon et al. | |
| 7,487,732 B2 * | 2/2009 | Johnston et al. | 111/121 |
| 2009/0255697 A1 * | 10/2009 | Friestad | 172/560 |

* cited by examiner

*Primary Examiner* — Matthew D Troutman
(74) *Attorney, Agent, or Firm* — Rebecca L. Henkel

(57) ABSTRACT

A ground opener unit for a seeding or planting unit includes an accessory mount attachable to an implement frame and a disc rotatably mounted to the accessory mount for forming a furrow in the ground. A scraper assembly includes a scraper plate defining a scraper edge for contacting and scraping a surface of the disc. The scraper plate is mounted to the arm by a pivot pin whose length defines a pivot axis about which the scraper plate may pivot in response to deflection of the disc. A spring is generally held in compression to bias the scraper plate against the disc.

6 Claims, 5 Drawing Sheets

APPARATUS FOR MOUNTING A SCRAPER ASSEMBLY TO AN ACCESSORY MOUNT OF A DISC OPENER THAT ALLOWS DEFLECTION OF THE SCRAPER ASSEMBLY

BACKGROUND OF THE INVENTION

The present invention relates generally to ground opener units, such as planting units for forming a furrow in the ground and depositing seeds therein. More particularly, the present invention relates to equipment of the type noted above employing a mounting arrangement for mounting a scraper assembly to the disc opener unit that allows the scraper assembly to deflect in response to deflection of a disc opener.

Planting assemblies of the type noted above are typically arranged such that the opener disc is held at an angle from the forward direction of travel so that the disc has a leading face and a trailing face. The disc displaces soil laterally as it travels forward and opens a furrow following the trailing face. In wet conditions, soil tends to stick to the trailing face so it is common to provide a scraper to clean the disc. The scraper also acts to prevent loose soil from falling back into the furrow until the seed is properly placed into the furrow. The disc is subject to flexing as lateral forces are applied to the disc when opening the furrow. The scraper must be held close to the disc but not so tightly as to cause a braking action on the disc; therefore it is desirable for the scraper to be allowed to flex and move with the disc's deflection.

The prior art has provided a variety of scraping devices for use in angled disc openers. Reference may be had for example to U.S. Pat. Nos. 4,760,806 and 5,787,994. Another exemplary scraping device employed a bracket which supported the disc scraper and which included a three bolt triangular pattern for adjusting the angle of the bracket. The bracket pivoted on the head of a carriage bolt as the three fasteners were tightened to effect angle adjustment. However, this prior design had a number of disadvantages in that adjustment of one fastener required corresponding readjustment of at least one of the other fasteners; adjustment of the desired angle was complicated and time consuming with the three fastener system and the bracket often became permanently deformed if one fastener was tightened without first loosening the others. Additionally, this rigid adjustment system did not allow the scraper to flex in response to irregularities or flexing of the disc blade.

Another exemplary scraping device is disclosed in U.S. Pat. No. 6,237,696, which describes the use of a resilient pad held against the scraper plate. The resilient pad provides enough force to hold the scraper plate against the disc so as to prevent debris, e.g., soil, from passing between the scraper plate and the surface of the disc, but is made of material that compresses to allow the scraper plate to deflect with deflection of the disc. The resilient pad has a limited range of travel and lacks a well defined point or axis of rotation.

SUMMARY OF THE INVENTION

The present invention is directed to a disc scraper assembly that permits quick and ready adjustment of the scraper to provide a scraper mounting that may pivot to allow scraper flexing in response to disc irregularities or flexing of the disc during use and furthermore to provide for rocking motion of the scraper about a well defined pivot axis thereby to assist in keeping the scraper edge against the disc surface while the disc flexes during use, thereby to ensure proper cleaning at all times.

A scraper assembly for a disc opener in accordance with the invention in one aspect includes a scraper plate defining a scraper edge for contacting and scraping a disc. The scraper plate defines a mounting region remote from the edge. The assembly further includes a scraper plate mount adjacent the mounting region and a spaced pair of fasteners extending through the mounting region to secure the scraper plate to the scraper plate mount. A biasing assembly couples the scraper plate mount to the frame of the disc opener. The biasing assembly includes a pin for coupling the scraper plate mount to the frame in a manner that allows limited pivoting of the scraper plate relative to a long axis of the pin and further includes a biasing component for placing a biasing force on the scraper plate such that the scraper plate maintains contact with the disc during deflection of the disc.

The above-noted biasing component preferably comprises a spring that is held in compression, which holds the scraper plate against the disc surface. When the disc flexes, the spring force applied by the biasing component allows the scraper plate to likewise flex, i.e., pivot about the pin that mounts the scraper assembly to the disc opener unit, so that a relatively consistent engagement of the scraper plate against the disc surface is maintained.

According to another embodiment of the invention, the scraper edge is disposed such that disc surface irregularities encountered by the scraper edge tend to create moments of force and pivoting motion of the scraper plate about a pivot axis defined along the length of the pivot pin.

In a further aspect of the invention the above described scraper assembly is combined with a ground opener unit including an accessory mount attachable to an implement frame and having a disc rotatably mounted to the accessory mount for forming a furrow in the ground. The disc is preferably held, in use, at an angle to the forward direction of travel to displace soil and open a furrow so that the disc has a leading surface and a trailing surface with the scraper assembly being adapted to scrape the trailing surface of the disc.

It is an advantage of this invention that the depth adjustment is relatively simple.

It is another advantage of this invention that the pivot pin provides a well defined axis of rotation of the scraper plate.

It is still another advantage of this invention that the biasing component provides bias of the scraper plate toward the disc surface while allowing flexing in response to disc deflection.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
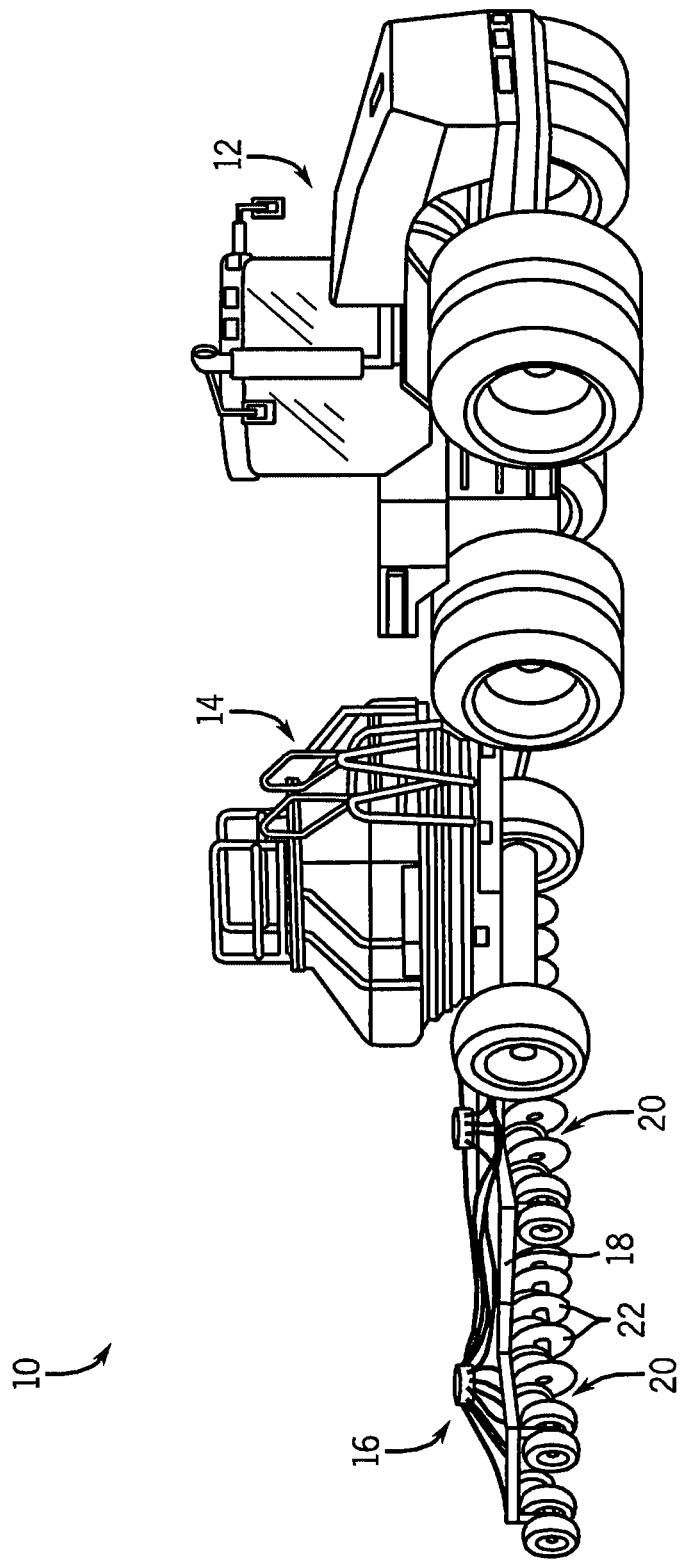
FIG. 1 is a pictorial view of an agricultural system.

Referring now to the drawings, and more particularly to FIG. 1, an agricultural planting system 10 is shown and, as known in the art, is generally comprised of a tractor 12, an air cart 14, and a planter 16. The air cart 14 and the planter 16 are hitched to the tractor 12 in a conventional manner. The planter 16 includes a tool bar 18 to which a set of disc opener units 20 are coupled. The disc opener units 20 each include a disc 22 designed to cut a furrow into the soil. As known in the art, the air cart 14 pneumatically delivers seed and/or fertilizer to a set of delivery tubes (not shown) of the planter 14 whereupon the seed and/or fertilizer is deposited in seed trenches or furrows cut by the discs 22.

Figure 2:
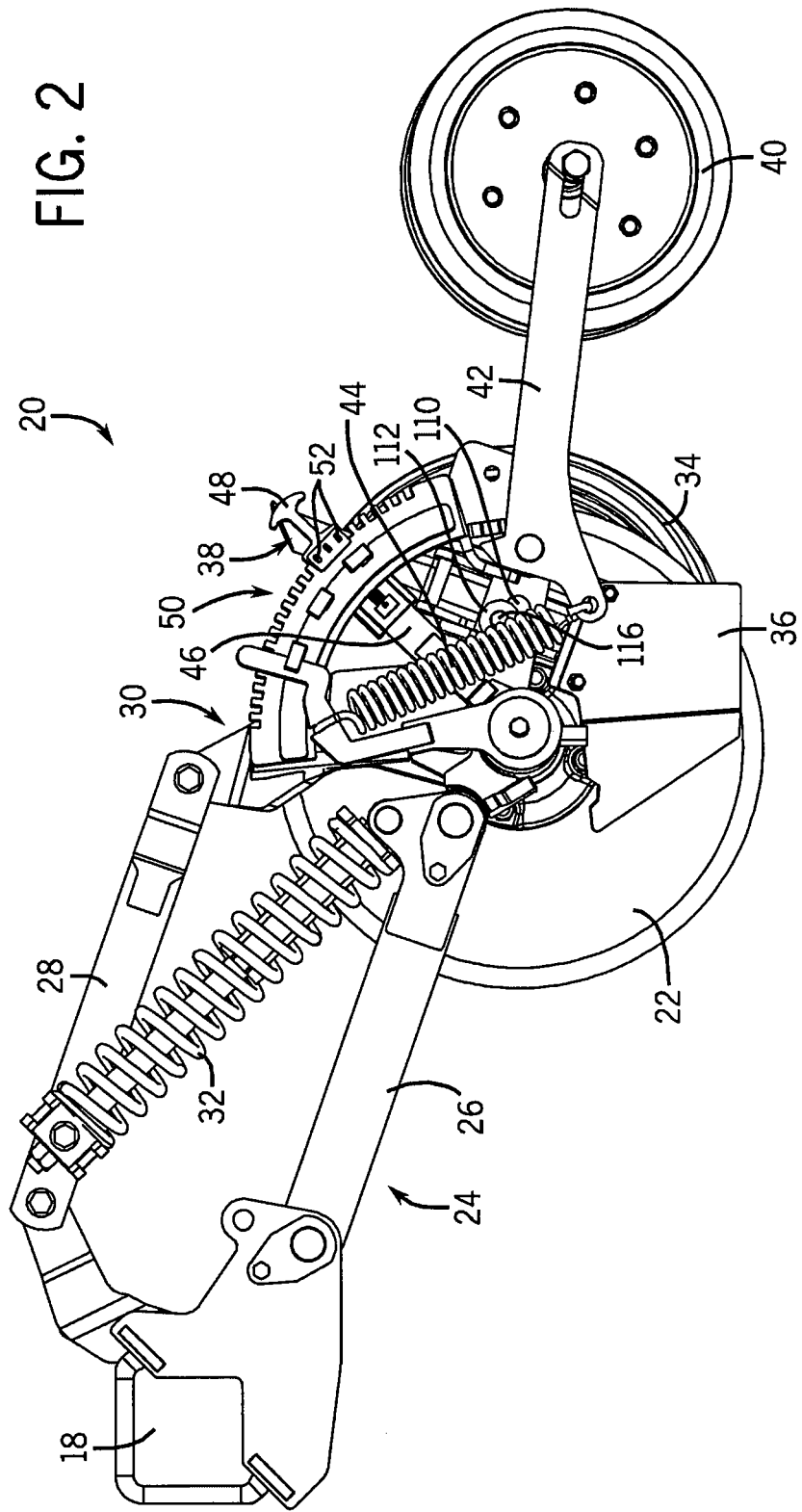
FIG. 2 is side elevation view of a disc ground opener unit incorporating a disc scraper assembly for use with the agricultural system of FIG. 1 in accordance with an embodiment of the invention.
Figure 3:
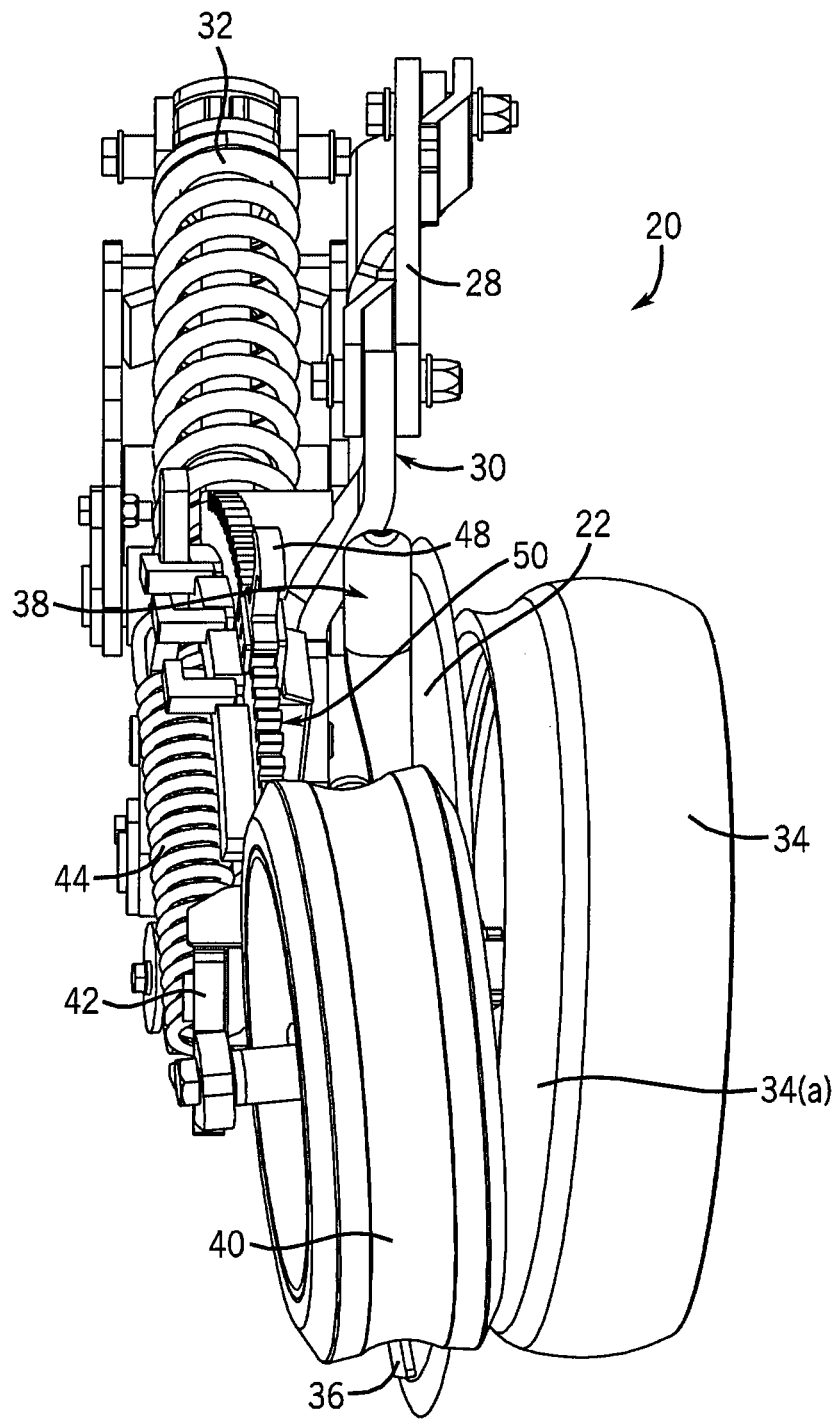
FIG. 3 is a rear end elevation view of the disc ground opener unit of FIG. 2.

An exemplary disc opener unit 20 is shown in FIGS. 2 and 3. Each disc opener unit 20 includes a linkage assembly 24 that in the illustrated unit includes a pair of links 26, 28 that are coupled to the tool bar 18 in a known manner at one end and connected to an accessory mount 30 at the opposite end. The opener unit 20 includes a spring 32 that applies downward pressure on the disc 22. Alternately, a hydraulic cylinder may be used to apply such downward pressure. Disc penetration is controlled by a gauge wheel 34 that is positioned in relative close proximity to the disc 22. In addition to controlling the penetration depth of the disc 22 the gauge wheel 34 also helps in keeping the adjacent side of the disc 22 clear of debris. That is, the gauge wheel 34 has a resilient shallow tire extending around its perimeter having a lip 34(a) which engages the adjacent face of the opener disc 22 to clean the latter during rotation in known fashion. A scraper blade 36 on the opposite side of the disc 22 is provided to keep the leading face of the disc 22 clear of soil, mud, and debris. In one preferred embodiment, the disc 22 is angled at an offset of approximately 7 degrees from vertical; although, different orientations are contemplated. The leading side of the disc 22 displaces soil and creates a furrow in the soil as the disc 22 is pulled through the soil by the tractor 12. In addition to providing a scraping function the scraper blade 36 also helps to hold the furrow open as seed and/or fertilizer is deposited into the furrow.

The disc opener unit 20 also carries a seed tube or boot assembly 38 that is flow-coupled to the air cart 14. As known in the art, seed and/or fertilizer is provided to the seed tube 38 which drops the seed and/or fertilizer into the furrow. A packer wheel 40 packs the furrow after the seed and/or fertilizer has been deposited. More particularly, the trailing wheel 40 is pivotally connected to the accessory mount 30 by way of a rearwardly extended packer arm 42 and a coil tension spring 44 that is connected between the packer arm 42 and accessory mount 30. The tension spring 44 biases the packer wheel 40 toward the ground to help close the furrow opened by disc 22 after seeds have been implanted therein in known fashion.

The gauge wheel 34 may be raised or lowered by rotation of a depth adjustment arm 46. Arm 46, which includes a generally T-shaped handle 48, may be rotated by a user pulling on handle 48. The accessory mount 30 includes an arc of notches 50 that define a range of discrete engagement points at which the handle 48 may be positioned. In one preferred embodiment, the notches 50 allow the gauge wheel 34 to set the penetration depth between 3.2 mm and 87 mm. The handle 48 has teeth 52 that are received by a selected number of the notches 50 to position the handle 48, and thus the arm 46, at a desired position. The arm 46 is coupled to a spindle (not shown) that carries the gauge wheel 34 and the disc 22. Rotation of the arm 46 between the discrete positions varies the position of the gauge wheel 34 and thus the penetration depth of the disc 22.

Figure 4:
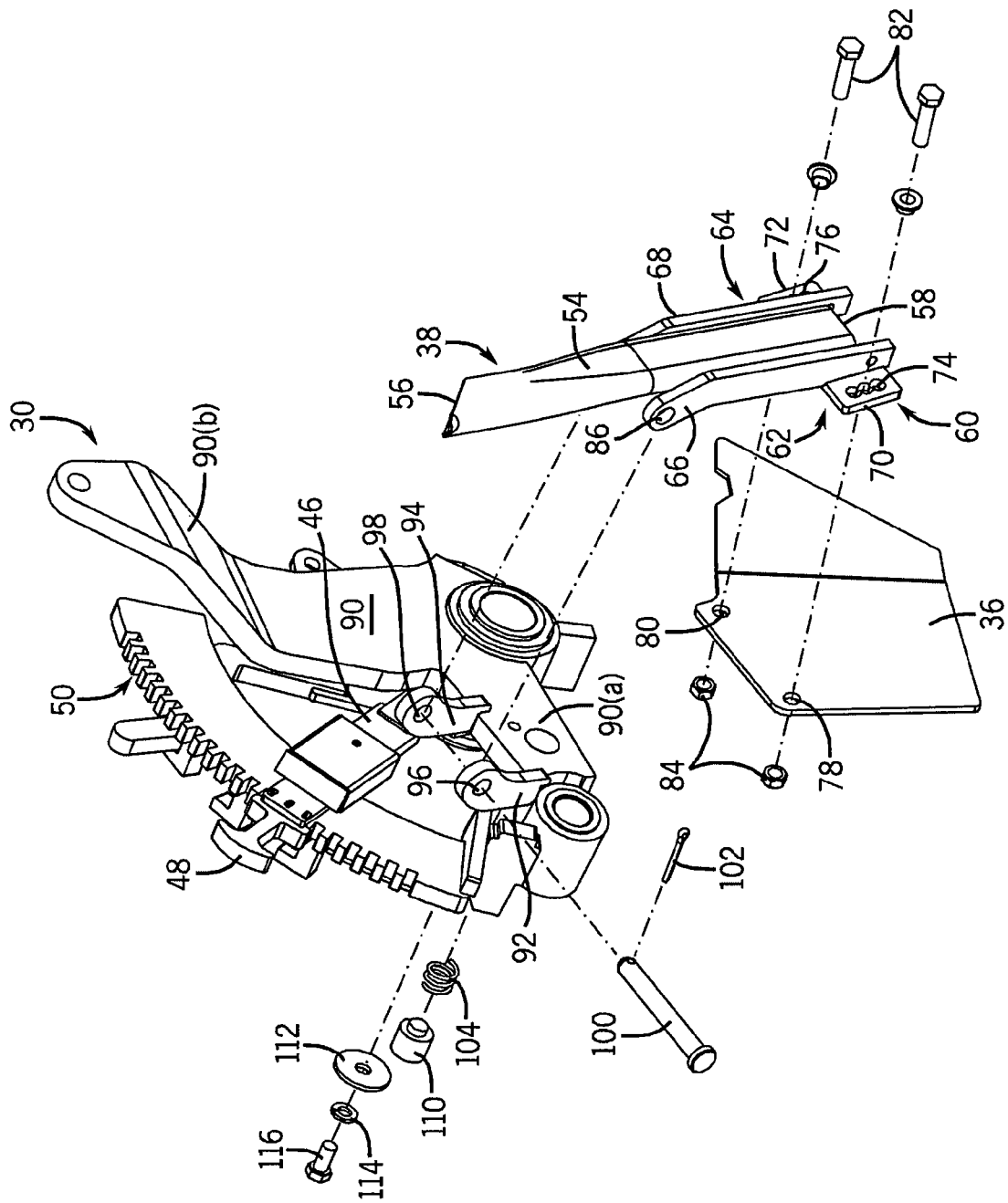
FIG. 4 is a partial exploded view of the disc ground opener unit of FIG. 2.
Figure 5:
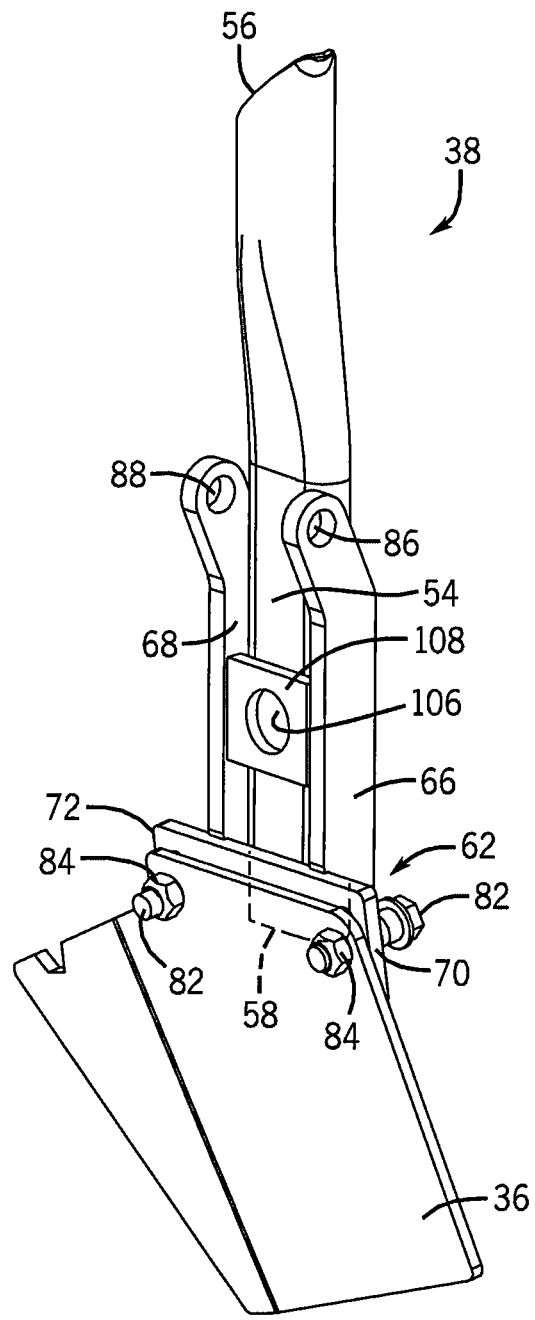
FIG. 5 is an isometric view of the seed tube and scraper plate of the disc ground opener unit of FIG. 2.

Referring now to FIGS. 4-5, the seed boot assembly 38 includes a seed tube 54 having an inlet end 56 flow-coupled to the air cart and an outlet end 58 through which seed is passed onto to the planting surface. The seed tube 54 is preferably integrally formed with a scraper mount 60 that includes a pair of mounting brackets 62 and 64. The mounting brackets 62, 64 respectively include upwardly extending legs 66, 68 adjacent opposite sides of the seed tube 54 and mounting flanges 70, 72 flared outwardly from the legs 66, 68. In a preferred embodiment, the mounting brackets 62, 64 are integrally formed with the seed tube 54. The flanges 70, 72 each include a set of scraper plate mount holes 74 and 76 that allow adjustability in the mounting of the scraper blade 36 to the scraper mount 60. The scraper plate 36 includes holes 78, 80 that are spaced from one another so to align with the respective sets of scraper plate mount holes 74, 76. With the scraper holes 78, 80 aligned with selected ones of the scraper plate mount holes 74, 76, fasteners 82 are inserted into the aligned holes and secured to the in place in a known manner, e.g., nuts 84. In a preferred embodiment, the scraper plate 36 can be mounted at three different positions or heights relative to the disc 22. Alternately, two sets of mounting holes could be formed in the scraper plate 36 with single holes formed in the mounting brackets 62, 64. It is also contemplated that each set of mounting holes could take the form of a slot effectively defining an infinite number of mounting positions. It is also contemplated that the scraper plate could be shimmed to provide additional adjustability. This adjustability allows the placement of the scraper plate to be adjusted in response to changing characteristics of the disc 22. For example, as the disc 22 wears down, the scraper plate 36 may need to be raised to account for the smaller diameter of the disc 22. Conversely, if the scraper blade becomes worn and a new disc is mounted, it may be desirable to lower the height of the scraper blade 36. It will be appreciated that the spacing between and the number of spacer mount holes 74, 76 may be different from that illustrated in the figures. The upper ends 66, 68 each include an eyelet 86, 88, the function of which will be described more fully below.

The frame 30 includes an accessory bracket 90 to which the seed boot assembly 38 is mounted. More particularly, the accessory bracket 90 includes a lower end 90(a) and an upper end 90(b), which is coupled to link 28 in a known manner. Arms 92, 94 extend upwardly from the lower end 90(a). Each arm 92, 94 has a respective eyelet 96, 98, and the arms 92, 94 are aligned such that eyelets 96, 98 are coaxial. The arms 92, 94 are spaced so that the legs 66, 68 of the seed boot assembly 38 are received in the space between the arms 92, 94. When properly positioned, the eyelets 86, 88, 92, and 94 will all co-align so that a pin 100 can be passed through the eyelets. The pin 100 can then be secured through the eyelets by a fastener 102, e.g., a cotter pin. Since the diameter of the pin 100 is less than the diameter of the eyelets and since the pin 100 is loosely retained by cotter pin 102, the seed boot assembly 38 is free to pivot about the pivot pin 100.

The leading edge of the scraper plate 36 is biased against the trailing surface of the disc 22 by a spring 104. With additional reference to FIG. 5, the spring 104 is held in a pocket 106 of a planar member 108 formed between the legs 66, 68 on the backside of the seed boot assembly 38. A spacer 110 compresses the spring 104 in the pocket 106. A retainer plate 112 is fastened to the lower end 90(a) of the bracket 90 by a lock ring 114 and fastener 116. The retainer plate 112 has a width sufficient to press against the backend of the spacer 110 to hold the spacer 110 against the spring 104, as shown in FIG. 2. In an alternate embodiment, a pocket is formed in the lower end 90(a) of the bracket. In this alternate embodiment, the spring 104 would therefore have one end seated in the pocket 106 of the seed boot assembly 38 and the other end seated in the pocket of the bracket 90. This embodiment would not use spacer 110 or retainer plate 116. Additionally, other types of biasing devices, such as a rubber plug, could be used instead of spring 104.

As noted above, the spring 104 biases the scraper plate 36 into engagement with the disc 22. The mounting of the seed boot assembly 38, and thus the scraper plate 36, to the bracket 90 by a pivotable connection allows the scraper plate 36 to deflect with deflection of the disc 22, such as when the disc hits an obstruction. Thus, when the disc 22 is pushed outwardly the spring will push the scraper plate 36 outwardly to maintain engagement with the disc 22. In a preferred embodiment, the spring 104 can be further compressed to allow the scraper plate to move inwardly in response to an inward movement of the disc. It will thus be appreciated that the present invention advantageously maintains contact of the scraper plate with the disc as the disc flexes in response to varying forces on its surfaces as it operates in the soil. Additionally, the invention maintains contact of the scraper plate with the disc despite distortions in the surface of the disc, which may occur during fabrication of the disc, for example.

Many changes and modifications could be made to the invention without departing from the spirit thereof. The scope of these changes will become apparent from the appended claims.

I claim:

1. An apparatus for mounting a furrow forming device and a scraper plate for keeping a surface of the furrow forming device substantially clear of debris to a tool bar of an agricultural implement, comprising:
   a bracket having an upper end adapted to be coupled to the tool bar and a lower end adapted to carry the furrow forming device;
   a receiver formed at the lower end of the bracket and adapted to receive an accessory that includes the scraper plate, wherein the receiver receives the accessory such that the scraper plate is adjacent the surface of the furrow forming device;
   a pin for loosely coupling the accessory to the receiver, wherein the pin defines a substantially fixed axis of rotation about which the scraper plate may pivot in response to deflection of the furrow forming device;
   mounting arrangement having a first end pivotably connected to the receiver and having a plurality of axially spaced mounting positions provided therein, the mounting arrangement including a pocket formed therein at a location spaced from the first end thereof;
   a fastener extending through the scraper plate and a selected one of the axially spaced mounting positions so as to interconnect the scraper plate to the mounting arrangement and to support the scraper plate at a desired position relative to the furrow forming device; and
   a biasing component having a first end maintained in the pocket, a second end mounted to the bracket and being operative to bias the scraper plate against the surface of the furrow forming device and to pivot the scraper plate in response to deflection of the furrow forming device.

2. The apparatus of claim 1 wherein the receiver includes a pair of upwardly extending flanges spaced apart from one another and each having a hole, and wherein the holes are co-aligned, and wherein the flanges are spaced apart a distance to receive the mounting arrangement, wherein the mounting arrangement includes at least one opening that co-aligns with the holes of the flanges when the mounting arrangement is received by the receiver, and wherein the pin is passed through the holes and the at as one opening to couple the accessory to the receiver.

3. The apparatus of claim 2 further comprising a cotter pin that retains the mounting arrangement and the receiver to the pin.

4. The apparatus of claim 1 wherein the furrow forming device is a disc opener.

5. The apparatus of claim 1 wherein the biasing component is a spring.

6. The apparatus of claim 1 wherein the fixed axis of rotation is defined along a shall of the pin.

* * * * *